April 5, 1966　　　J. E. TATSAK　　　3,244,294
TURNOVER DEVICE

Filed Dec. 26, 1963　　　　　　　　　3 Sheets-Sheet 2

INVENTOR
JACK E. TATSAK

BY Oscar L. Spencer
ATTORNEY

April 5, 1966  J. E. TATSAK  3,244,294
TURNOVER DEVICE
Filed Dec. 26, 1963  3 Sheets-Sheet 3

INVENTOR
JACK E. TATSAK

BY Oscar H. Spencer
ATTORNEY

United States Patent Office 3,244,294
Patented Apr. 5, 1966

3,244,294
TURNOVER DEVICE
Jack E. Tatsak, Templeton, Pa., assignor to Pittsburgh Plate Glass Company, Pittsburgh, Pa., a corporation of Pennsylvania
Filed Dec. 26, 1963, Ser. No. 333,407
7 Claims. (Cl. 214—1)

This invention relates to a device for picking up and turning over objects, while transferring them from one surface to another. As shown herein the device is coordinated with the operation of a glass press machine, but it is useful in numerous other environments.

It is an object of this invention to provide a new and relatively simple structure for grasping, transferring and inverting various types of articles.

The achievement of this object may be appreciated by a study of the following description and drawings wherein.

Figure 1:
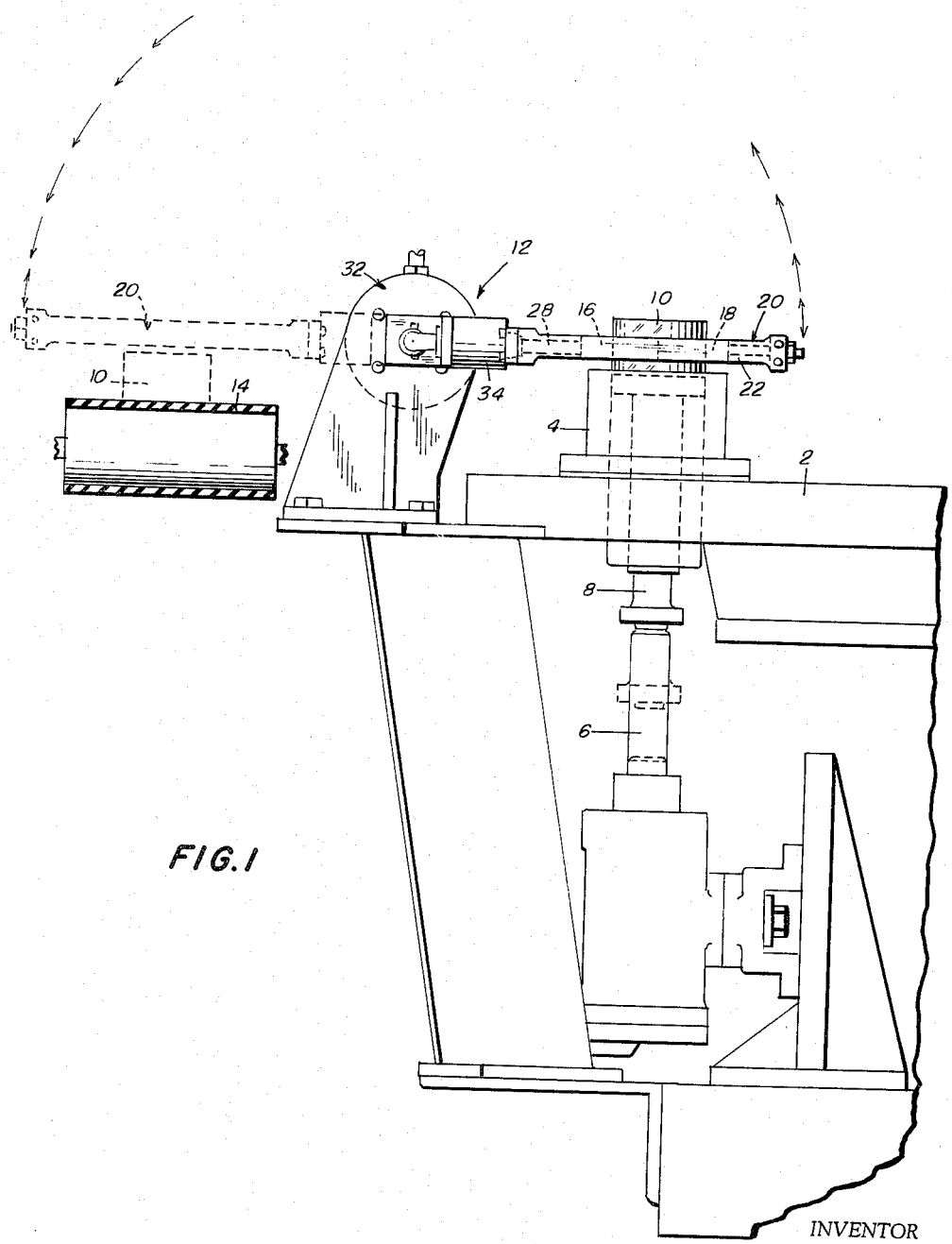
FIG. 1 is an elevation of the subject device, shown picking up a lens blank from an optical press.
Figure 2:
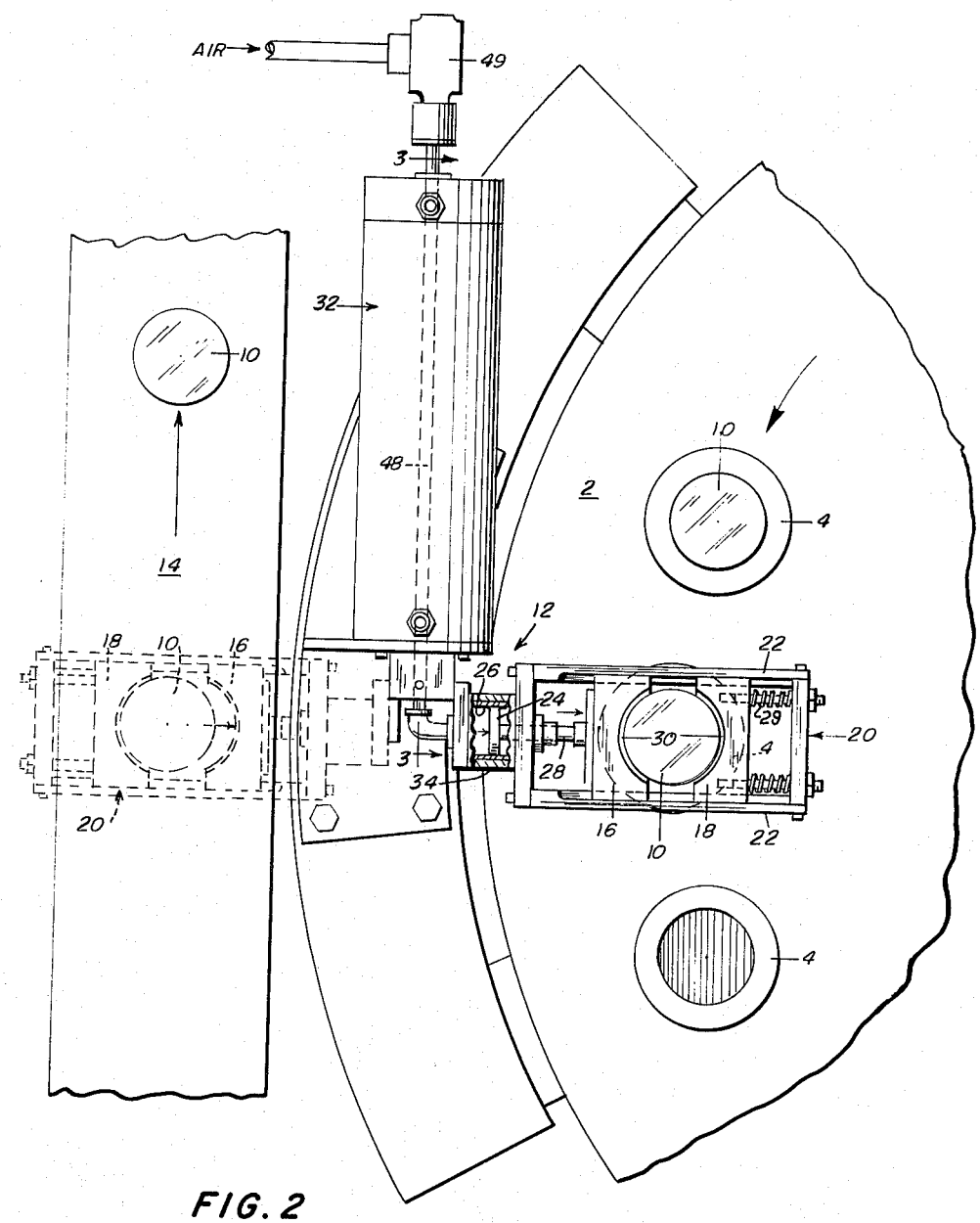
FIG. 2 is a plan view of the apparatus shown in FIG. 1.

In FIGS. 1 and 2, the turnover device is shown in use with a press for producing optical lens blanks. The press includes a rotating table 2 which moves a plurality of molds 4 in intermittent fashion to various indexed positions where operations are performed on the glass. FIG. 1 shows a mold 4 in the indexed position where the lens blank is removed from the mold. This is done, in part, by means of a fluid operated plunger 6 which presses upwardly on an extension 8 which depends from the movable mold bottom. This causes the mold bottom to rise and the lens blank 10 is exposed so that it may be grasped by the inverting and transferring device, generally designated 12. By means of the device 12, the lens blank 10 is inverted while being transferred to a conveyor 14, located adjacent to the glass press machine.

To grasp the lens blank, a pair of jaw members 16 and 18 are held within the frame 20, in the manner shown in FIG. 2. These jaws are slidably mounted for movement relative to each other along a given axis which is parallel to the side members 22 of frame 20.

A fluid operated expansible chamber motor, including piston 24 and cylinder 26 attached to the frame 20 is used to move the jaw 16 toward and away from the other jaw. The piston rod 28 attaches the piston to the jaw 16. Means within the cylinder 26 normally hold the jaws in their open position when pressurized fluid is not being delivered to the cylinder.

Jaw 18 is also slidably mounted and it is biased, by springs 29, toward the jaw 16. The jaws may carry asbestos pads 30 to prevent abrasion to the glass and to prevent uneven cooling of the lens blanks.

Figure 3:
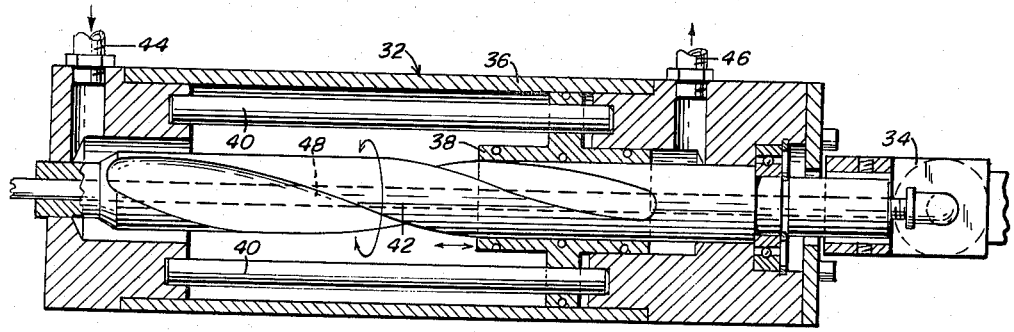
FIG. 3 is a sectional view of the means for rotating the jaws of the turnover device.

In order to rotate the jaws about a horizontal axis a rotary actuator 32 is attached to the frame 20 by means of a bracket member 34, which bracket member also houses the cylinder 26. This rotary actuator 32, shown in FIG. 3 is a modification of a commercially available device of the type shown in U.S. Patent 2,974,646 to J. C. Miller et al., issued March 14, 1961.

Turning to FIG. 3, a cylinder 36 has a piston 38 slidably mounted therewithin. A pair of fixed rods 40 pass through the piston and prevent it from rotating. A helically threaded aperture is located at the central axis of the piston, and this receives a helically threaded rod 42. The threads within the piston aperture follow the rod threads. The axis of rod 42 intersects and is generally perpendicular to the axis along which the jaws move, and it is prevented from moving along its own axis by means of the housing configuration and the rod bearings. Therefore, when the piston is moved axially, the rod 42 will rotate.

Air under pressure may be used to move the piston 38. When air is admitted through conduit 44, the piston is moved to the right as viewed in FIG. 3; and when air is admitted through conduit 46, the piston moves to the left. When air is admitted into either conduit, the opposite conduit is vented to the atmosphere.

The rod 42 has a centrally located, longitudinally extending bore 48 which serves as a portion of the conduit carrying air to the cylinder 26. This bore connects at one end through a swivel connection 49, to the source of fluid pressure for actuating the jaws; and at the opposite end to the jaw actuating cylinder 26, through a suitable elbow.

Figure 4:
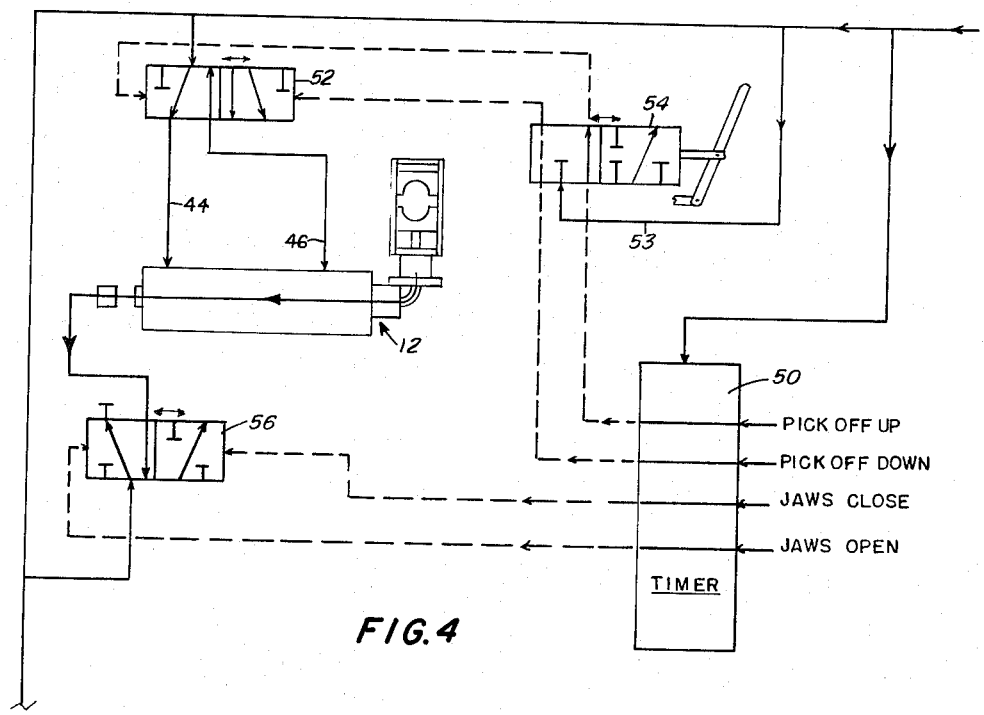
FIG. 4 is a diagrammatic sketch of the controls and valves of the subject apparatus.

FIG. 4 shows a diagrammatic layout of the various conduits and valves which control the subject turnover device. A timer 50 is used to dispense air at the proper times to shift the various control valves such as slide valves 52 and 56. The air so dispensed passes through the conduits shown in broken lines. This control air only shifts the valves, and does not in itself provide the motive power to actuate any of the elements of the turnover device. The actual work is done by the air in the conduits shown in solid lines.

The rotary actuator valve 52 is shown in the position where pressurized air is led through the conduit 44 and the conduit 46 is vented. When this valve 52 is shifted, pressure will be fed through conduit 46 and the other conduit will be vented.

This valve 50 is normally shifted from one position to another by air impulses dispensed by the timer 50; however, occasions will arise when safety will require that the device be retracted to its unloading position for a period of time. This is done by means of the hand operated valve 54 which when shifted from its normal position causes air from conduit 53 to move the jaws and frame to their position away from the table. Hand operated valve 54 is normally in the illustrated position.

Jaw control valve 56 is also shifted from one position to another by means of air impulses from the timer 50. In the position shown, air cannot get to the jaw actuating cylinder 26 and the jaws 16 and 18 will remain open. When the control air causes valve 56 to shift to the left air will be directed through the bore 48 to the cylinder 26 to close the jaws.

The timer is set so that the elements go through the following sequence of operations: (1) rotate to loading position, (2) close jaws, (3) rotate to unloading position, (4) open jaws. The time intervals between these steps in the sequence may vary widely, depending on the speed of the machine and various other factors.

Having described only one embodiment of the invention, I am aware that various modifications will occur to those skilled in the art. The scope of the invention encompasses those modifications which fall within the bounds of the following claims.

I claim:
1. A device for inverting and transferring an article comprising: a pair of article grasping jaws each movable along a given axis and with respect to each other, means for moving one said jaw along said axis, means for rotating said given axis and said jaws about a generally horizontal axis through an angle of substantially 180°, said horizontal axis intersecting said given axis at a point displaced from said jaws.

2. A device for inverting and transferring an article comprising: a pair of article grasping jaws each movable along a given axis and with respect to each other, means for moving one said jaw along said axis, means for rotating said given axis and said jaws about a generally horizontal axis through an angle of substantially 180°, said horizontal axis being perpendicular to said given axis and intersecting said given axis at a point displaced from said jaws.

3. A device for inverting and transferring an article comprising: a pair of article grasping jaws each movable along a given axis and with respect to each other, an expansible chamber motor concentric with said given axis for moving one said jaw along said axis, means for rotating said given axis and said jaws about a generally horizontal axis through an angle of substantially 180°, said horizontal axis intersecting said given axis at a point displaced from said jaws.

4. The device of claim 3 wherein resilient means bias another said jaw in a direction toward one said jaw.

5. A device for inverting and transferring an article comprising: a pair of article grasping jaws each movable along a given axis and with respect to each other; jaw moving means for moving one said jaw along said axis; axis rotating means for rotating said given axis and said jaws about a generally horizontal axis through an angle of substantially 180°; said horizontal axis intersecting said given axis at a point displaced from said jaws; said axis rotating means including a fixed hollow cylinder, a piston slidable within said cylinder, means preventing said piston from rotating, said piston having a helically threaded aperture through its central axis, a rotatable helically threaded rod extending through said aperture and lying on said horizontal axis, means holding said rod from axial movement, means connecting said rod to said jaws, and fluid pressure means for moving said piston.

6. A device for inverting and transferring an article comprising: a pair of article grasping jaws movable along a given axis with respect to each other; a fluid operated motor for moving one said jaw along said axis; conduit means carrying fluid to said fluid operated motor; axis rotating means for rotating said given axis and said jaws about a generally horizontal axis; said horizontal axis intersecting said given axis at a joint displaced from said jaws; said axis rotating means including a fixed hollow cylinder, a piston slidable within said cylinder, means preventing said piston from rotating, said piston having a helically threaded aperture through its central axis, a rotatable helically threaded rod having a longitudinally extending interior bore extending through said aperture and lying on said horizontal axis, said bore being a portion of said conduit means, means holding said rod from axial movement, means connecting said rod to said jaws, and fluid pressure means for moving said piston.

7. A device for inverting an article comprising, a frame, a pair of opposed jaws on said frame and movable with respect to each other along an axis, means moving at least one jaw along said axis, a rotatable rod having helical threads, said rod lying approximately perpendicular to said jaw axis and attached to said frame, non-rotatable thread follower means movable axially with respect to said rod and engaging said helical threads, and means supplying energy to said jaw moving means including a conduit extending longitudinally through said rod.

References Cited by the Examiner

UNITED STATES PATENTS

| 1,744,128 | 2/1930 | Lorenz | 65—260 X |
| 2,093,658 | 9/1937 | Hildenbrand | 294—103 X |
| 2,573,660 | 10/1951 | Brownell. | |
| 2,580,472 | 1/1952 | Smith. | |
| 2,917,338 | 12/1959 | Blue | 294—103 X |
| 2,925,183 | 2/1960 | Eastus. | |
| 2,974,646 | 3/1961 | Miller | 91—26 |

MARVIN A. CHAMPION, *Primary Examiner.*

GERALD M. FORLENZA, *Examiner.*